United States Patent [19]

Tang

[11] Patent Number: 4,842,739
[45] Date of Patent: Jun. 27, 1989

[54] HIGH SURFACE AREA FILTER CARTRIDGE

[75] Inventor: Yuan-Ming Tang, New Brigton, Minn.

[73] Assignee: Minnesota Mining and Manufacturing Company, St. Paul, Minn.

[21] Appl. No.: 87,204

[22] Filed: Aug. 20, 1987

[51] Int. Cl.$^4$ .............. B01D 27/06; B01D 29/34
[52] U.S. Cl. .............. 210/489; 210/493.5; 210/494.1; 210/497.2; 55/485; 55/500; 55/521
[58] Field of Search .............. 210/315, 493.1, 493.5, 210/494.1, 497.01, 497.2, 489; 55/485, 497, 498, 500, 521

[56] References Cited

U.S. PATENT DOCUMENTS

| | | | |
|---|---|---|---|
| 426,945 | 4/1890 | Maignen | 210/493.1 |
| 1,928,049 | 9/1933 | Daniels | 55/521 |
| 2,186,440 | 1/1940 | Williams | 210/493.1 |
| 2,556,521 | 6/1951 | Chase | 210/493.5 |
| 2,732,951 | 1/1956 | DeMagandeau | 210/493.1 |
| 2,933,192 | 4/1960 | Gretzinger | 210/493.1 |
| 3,219,191 | 11/1965 | Suchy | 210/493.1 |
| 4,594,162 | 6/1986 | Berger | 210/493.1 |

Primary Examiner—Richard V. Fisher
Assistant Examiner—Wanda L. Millard
Attorney, Agent, or Firm—Donald M. Sell; Walter N. Kirn; Roger R. Tamte

[57] ABSTRACT

New, high surface area per unit volume, generally cylindrical filter cartridge for gaseous or liquid filter applications are described. These filter cartridges which comprise a nested arrangement of substantially disk shaped layers having a radial pleat pattern embossed therein, are capable of achieving higher surface areas per unit volume than can be achieved with conventionally pleated filter cartridges. Utilization of the filter media is extremely high as blocking of adjacent layers of filter media is avoided and fluids are evenly distributed over the total area of the filter media as a result of the series of channels created by the nesting of the disk shaped pleated layers.

21 Claims, 1 Drawing Sheet

HIGH SURFACE AREA FILTER CARTRIDGE

BACKGROUND OF THE INVENTION

The present invention relates to filter cartridges for fluids and more particularly to high surface area, replaceable filter cartridges for gas or liquid filtration applications.

Efforts to increase the effective filter area while minimizing filtration unit size have led to a variety of filter arrangements in which a flat filter sheet is folded into pleated structures.

In U.S. Pat. No. 2,683,537, a generally cylindrical filter cartridge is produced from a flat paper filter sheet in which the connecting area between pleats has a series of tucks which allow the course of the pleats to be reversed without cutting the filter paper.

Alternative pleated structures for a filter cartridge are disclosed in U.S. Pat. No. 2,897,971 and U.S. Pat. No. 3,087,623, where a multiplicity of pleated cylindrical elements are interconnected by adhesively or mechanically bonding the free edges of adjacent elements together.

A more conventional approach to increasing the available filtration area while minimizing the volume of the filter unit involves the use of longitudinal, accordion pleats wherein the filter media is folded into a pleated structure and formed into a generally cylindrical shape. U.S. Pat. No. 3,867,294 and EP 44,042 disclose two of many variations of this basic concept.

Another approach to increasing the surface area of filter cartridges involves the formation of a series of disk filter layers in a stacked configuration is disclosed in U.S. Pat. No. 4,594,162. In this structure, the filter media is formed around a mandrel by means of a pneumatic pleating operation to produce a high density stacked disk layer filter.

SUMMARY OF THE INVENTION

The present invention relates to high surface area per unit volume, generally cylindrical filter cartridges for gaseous or liquid fluid filtration. These filter cartridges comprise a nested arrangement of disk shaped filter layers having a radial pleat pattern comprising a pattern of regular radial pleats. A secondary pattern of irregular wave like radial pleats generally results from packing of the structure around the inner circumference of the disk shaped layers to form the filter cartridge.

While one of the principal objectives of the present invention is to provide a filter cartridge having a higher surface area per unit volume than is possible with conventional pleated cartridges, the surface area of the filter cartridges of the present invention can be controlled over a wide range simply by varying the packing or nesting density of the disk shaped layers. Additionally, the nesting density can be controlled in a continuous or discontinuous manner over the length of the filter cartridge so as to produce filter cartridges having a uniform or gradient distribution of filter media over the length of the cartridge.

In one embodiment of the invention, filter cartridges are prepared from tubular elements generated from flat filter media having embossed thereon a series of transverse raised and recessed shapes. The disk shaped layers of the filter cartridges of the present invention are generated by folding the tubular elements to produce composite radially pleated disk shaped layers.

In another embodiment of the invention, the filter cartridge has a generally cylindrical shape and comprises a filter element having a multiplicity of layers of filter media of increasingly finer downstream porosity. The filter media is preferably a nonwoven material, and more preferably, a nonwoven microfiber web or a fibrillated film web. A series of nonwoven webs, including an upstream prefilter layer, fine particle filtration media and a downstream cover layer, are seamed together by one or more fluid impervious seams to produce a flat tubular element which is then embossed through the application of heat and pressure. The resulting embossed structure is opened, folded and longitudinally collapsed to form a generally cylindrical filter element comprised of stacked disk shaped layers. Filter cartridges are prepared from the longitudinally collapsed filter elements by inserting the filter elements into a preformed cartridge or by attaching endpieces to the filter elements by means of fluid impervious seals. Alternative cartridge filter constructions, wherein one end of the filter element is sealed to itself rather than to an endpiece, are also possible with the present invention. Additionally, inner and outer support structures may be added to the filter cartridge assembly to provide supplemental support to the cartridge to assist in maintaining its shape in high pressure filtration applications. The filter cartridges of the present invention can be readily adapted to either an inward-out or an outward-in flow configuration.

DETAILED DESCRIPTION OF THE INVENTION

The filter cartridges of the present invention comprise a filter element of nested substantially disk shaped layers having a radial pleated pattern, said filter cartridges having higher surface areas per unit volume than conventionally pleated filter cartridges. The filter cartridges are readily adapted to filtration applications involving either gaseous or liquid fluids. A variety of filter media, including paper, woven or nonwoven webs, sorbant loaded webs, permeable membranes and porous metals can be utilized in the present invention.

Figure 1:
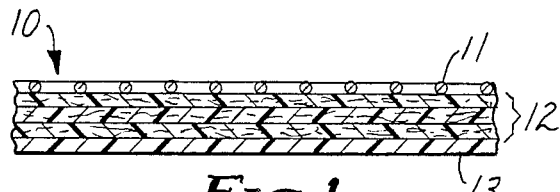
FIG. 1 is a schematic illustration of a cross-section of one embodiment of laminated filter media of the present invention.

The filter element comprises at least one layer of filter media. FIG. 1 illustrates a cross-section of one embodiment of the invention in which the filter element or sheet 10 comprises a coarse upstream prefilter layer 11, filtration media 12 comprising a multiplicity of filter media layers having increasingly finer downstream porosity, and a downstream cover layer 13.

Suitable materials for the upstream prefilter layer include thermoplastic scrims, thermoplastic spunbond webs or staple fiber nonwoven webs having thermoplastic binder systems.

While a variety of materials can be used for the fine particle filtration media 12, nonwoven materials or permeable membranes are the materials of choice. The nonwoven materials are typically fibrous webs having an average fiber diameter of less than about 100 microns or fibrillated film webs such as those described in U.S. Pat. No. Re. 31,285. Fibrous filtration media based on polyolefins (e.g., polyethylene, polypropylene), polyesters (e.g., polyethylene terephthalate) or polycarbonate are suitable. The fine particle filtration media are typically in the form of microfiber webs or blown microfiber webs having an average fiber diameter of less than about 10 microns. Blown microfiber webs can be conveniently prepared according to the procedures taught by Wente, Van A., "Superfine Thermoplastic Fibers" in *Industrial Engineering Chemistry*, Vol. 48, 1342 et seq (1956), and when they are prepared in persistent electrically charged form (see Kubik et al, U.S. Pat. No. 4,215,682), they are especially useful. Permeable membranes such as a Metricel polypropylene membrane (0.2 pore size, available from Gelman, Ann Arbor, MI) or the membrane material described in U.S. Pat. No. 4,613,544 are particularly well suited as filter media for the present invention.

Suitable materials for the downstream cover layer 13 include finish free, low debris thermoplastic webs such as spunbond webs or nonwoven webs based on thermally activated binder fibers such as spunbond polypropylene webs.

Figure 2:
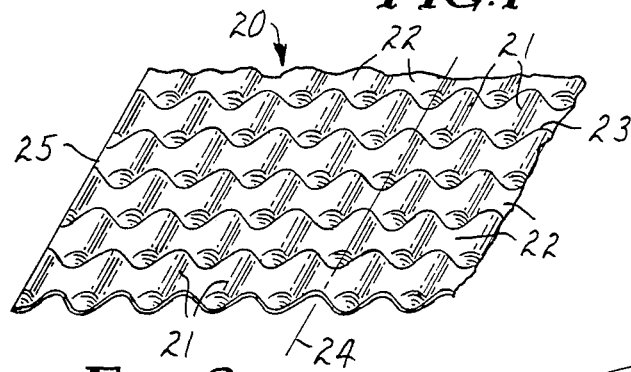
FIG. 2 is an illustration of a pattern of shapes embossed on filter media utilized to produce filter cartridges of the invention.
Figure 3:
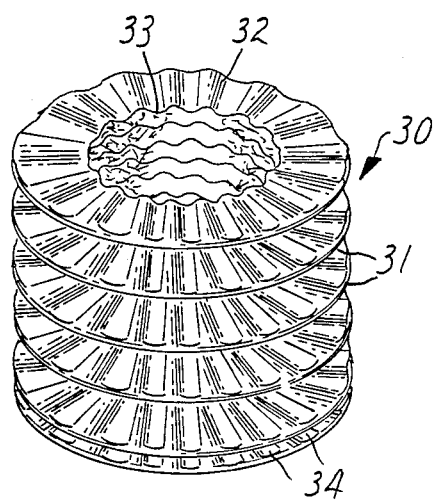
FIG. 3 is a schematic illustration of a longitudinally collapsed cylindrical filter element of the invention.

Tubular filter elements or sheets 30 formed from filter media laminates illustrated in FIG. 1 are prepared by folding a laminate over upon itself or stacking two laminates with their downstream cover layers 13 adjacent to each other and joining the free edge(s) together by means of a fluid impervious longitudinal seal 25 as illustrated in FIG. 2. A number of techniques are applicable to the formation of this seal including, but not limited to, adhesive bonds, heat sealing, mechanical bonding, thermo-mechanical bonding or ultrasonic welding. More complex, multi-lobal filter shapes having a generally cylindrical overall shape requiring more than two sections of filter media laminates and a multiplicity of longitudinal fluid impervious bonds are also possible with the filters of the present invention.

Preparation of filter elements 30 from substantially flat filter media requires that the media have a regular pattern of transverse and longitudinal forming lines on the filter media which define fold lines for creating the disk shaped layers and the primary radial pleat pattern which is superimposed on those elements. The forming line pattern can consist simply of a series of lines embossed on the filter media or by introducing a multiplicity of transverse rows of raised and recessed shapes on the filter media. Either alternative can be developed as a part of the manufacturing process for the media or introduced into the media prior to assembling the filter laminate.

Alternatively, the filter laminate may be assembled and the desired line or shape pattern imparted to it by an embossing operation. A variety of geometric shapes, including regular shapes (e.g., partial cylinders, squares, rectangles and triangles) or irregular shapes can be embossed on the filter laminates. The shapes must be arrayed such that, on the unopened tubular element, it defines a series of transverse lines, which correspond to the fold lines that create the disk shaped layers, and a series of longitudinal lines, which define fold lines that create the primary regular radial pleat pattern on the disk shaped layers.

Embossed media is preferred to lined media for forming the filter elements of the present invention as the embossed media produces a more uniform primary radial pleat pattern due to the fact that the raised and recessed shapes provide a predetermined alternating folding direction for the media during the folding operation. Additionally, the regularity of the primary radial pleat pattern facilitates packing or nesting of adjacent disk shaped layers which enables higher surface area per unit volume to be achieved.

One embodiment of an embossed pattern on the filter laminate which produces the unique folding pattern for filters of the present invention is illustrated in FIG. 2. The filter laminate 20 has a multiplicity of rows of alternating raised 21 and recessed 22 partial cylinders. Adjacent transverse rows of the embossed units are offset from each other by a distance corresponding to the width of the partial cylinder. This displacement results in a series of transverse, wave shaped lines 23 described by the junction of adjacent rows of partial cylinders which, in turn, defines the inward and outward fold lines that create the disk shaped layers of the longitudinally collapsed tubular filter element. The height of the partial cylinder, which is typically less than about 50% of the radius of the collapsed cylindrically shaped tubular filter element, determines the depth of the transverse pleats. Regions where the raised partial cylinders transition into the recessed partial cylinders describe a series of longitudinal lines 24 which define the fold lines of the primary regular radial pleat pattern that is superimposed on the disk shaped layers of the filter.

Filter elements 30 of the present invention are prepared from embossed tubular laminate elements 20 illustrated in FIG. 2 by opening the tubular element and initiating an alternating inward/outward folding of adjacent transverse lines of the laminate which causes a longitudinal collapse of the tubular element and concurrent formation of the disk shaped filter members or layers 31 of the filter structure. Interaction of the longitudinal lines 24 of the laminate with the transverse lines during the folding operation produces the primary regular radial pleat pattern 32. Packing of the filter media around the inner circumference of the filter causes the primary radial pleat pattern 32 to form a secondary, irregular wave-like radial pleat pattern 33. The irregular pattern of the secondary radial pleat pattern 33 can manifest itself over the total disk shaped layer, but it typically has its maximum amplitude around the inner circumference of the filter. The primary and secondary radial pleat patterns 32, 33 of adjacent disk layers creates a series of channels 34 leading into the central portion of the filter element which evenly distributes the fluid over the total filter element. This feature enables the filters of the present invention to utilize essentially all of the area of the filter media which correspondingly leads to higher loading capacities per unit volume than can be achieved with conventional pleated filter cartridges. As will be seen from the drawings, each filter member 31 comprises two annular sections of the filter element or sheet 30. The annular sections are connected together at their outer circumference, which is the fold line between the sections.

A range of diameters of filter cartridges can be prepared from the same tubular element by initiating the inward/outward folding action on non-adjacent transverse fold lines on the tubular element. Thus, by folding on every second or third transverse line, filter cartridges having a pleat depth $2\times$ or $3\times$ that obtained from folding on adjacent transverse lines can be obtained. Alternative structures can also be created from the same tubular element by involving a mixed pattern of adjacent and non-adjacent transverse fold lines in the inward/outward folding pattern.

Filter elements of the present invention are typically assembled into cartridge units in which the filter element is attached to endpieces by means of fluid impervious bonds. A number of techniques are suitable for this attachment, including adhesive attachment, solvent welding, mechanical attachment, thermo-mechanical attachment or ultrasonic welding. The endpieces of the cartridge are fitted with a means for introducing or removing fluids to or from the interior of the filter cartridge. An alternative construction of the filter cartridge involving the use of a single endpiece and sealing the opposite end of the filter element to itself by means of a fluid impervious bond similar to that used in the longitudinal seam formation is also possible.

Figure 4:
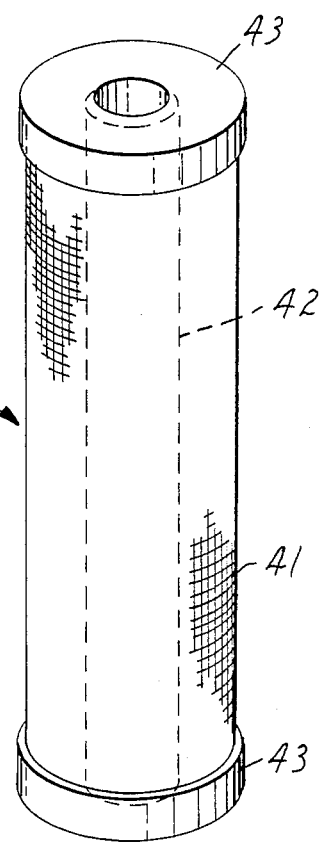
FIG. 4 illustrates inner and outer supplemental support structures for filter cartridges of the present invention.

The filter elements of the present invention can be made substantially self-supporting by the appropriate selection of prefilter materials, filtration media and downstream cover materials. However, in many applications it is desirable to provide additional internal or external support for the filter element. Under these circumstances a supplemental support structure 40 similar to that illustrated in FIG. 4 may be advantageously incorporated into the filter cartridge assembly. An external support 41 such as a screen or casing with a multiplicity of holes can provide additional support in an inward-out fluid flow mode to reduce the likelihood of the filter element rupturing. Similarly, an inner support structure 42 consisting of a screen, a porous casing or similar constructions can provide support to prevent the filter element from collapsing under high pressure applications in an outward-in fluid flow situation. In both cases, the supplemental support structure is normally attached to the endpiece 43 of the cartridge assembly to provide an integral unit.

EXAMPLES

Example 1

Two layers of a laminated filter media consisting of a prefilter of polypropylene scrim (Conwed XN-3232, available from Conwed Corp.), two layers of polypropylene blown microfiber web (40 gm/m² basis wt., each approximately 0.018 cm thick), and a downstream cover layer of spunbond polypropylene (Lutrasil 5020, available from Lutravil Co.), were brought together with the spunbond cover layers in contact with one another and the composite passed through a Branson Sonic Welder in a continuous welding mode (approximately 20-25 psi pressure) to form a series of parallel bond lines spaced approximately 11.43 cm apart, thereby forming a continuous unopened tube. A single tubular element was separated from the tube and embossed with a pattern of alternating raised and recessed partial cylindrical shapes approximately 0.4 cm high and 0.5 cm wide (the partial cylinder was approximately 1.65 cm long and had a radius of approximately 0.25 cm) by passing the tubular element through a roller assembly having a heated (approximately 85° C) patterned metal roller. The roller assembly was adjusted to maintain approximately 0.7 kg/cm² pressure on the tubular element during the embossing process. The embossed element was opened between the two spunbond cover layers and placed over an approximately 3.5 cm diameter support tube to form a generally cylindrical tubular element. Two intersecting wire loops were positioned over a transverse line 24 just beneath the support tube. Pulling the two wire loops together caused the transverse line 24 to collapse and create the first fold of a disk shaped layer. The tubular element was lowered slightly, the wire loops opened and positioned over the third transverse line on the laminate and pulled together to complete the formation of the disk layer. The composite radial pleat pattern on the disk layer was formed concomitantly with the disk layer formation. This process was repeated on alternate transverse lines until disk layers had been formed along the total length of the element. The thus folded filter element was then compressed to form a cylindrically shaped filter element approximately 7 cm in diameter and 25 cm long. Endpieces were attached to the filter element by potting the filter element in hot melt adhesive in each endpiece.

Example 2

An approximately 24 cm × 400 cm laminate construction consisting of an upstream prefilter of polypropylene scrim (Conwed XN-3232), a filtration layer of polypropylene blown microfibers (40 gm/m² basis wt., each approximately 0.018 cm thick) and a downstream cover layer of spunbound polypropylene (Lutrasil 5020, available from Lutravil Co.), was folded over on itself to form an approximately 12 cm × 400 cm sandwich having the downstream cover layer as the central layers. The free edge of the folded sandwich was ultrasonically welded together using a Branson Sonic Welder (continuous welding mode, approximately 20-25 psi pressure) to form an unopened tubular element. The tubular element was embossed, folded and compressed as described in Example 1 to form a cylindrically shaped filter element approximately 7 cm in diameter and 25 cm long. Endpieces were attached to the filter element by potting the filter element in hot melt adhesive in each endpiece.

Example 3

A filter element similar to that described in Example 1 but having a surface area of 0.623 m² was prepared using 40 gm/m² basis weight (0.018 cm thick) polypropylene web as the filtration layer. The filter cartridge was compared to a conventional pleated filter cartridge having the same filter media and external dimensions but a surface area of 0.464 m², for their ability to filter AC Fine Air Cleaner Test Dust (available from A.C. Spark Plug Division, General Motors Corp.), from a stream of water at a flow rate of 11.4 liters per minute. Results of the comparison are shown in Table 1.

TABLE 1

| Filter | Surface Area (m²) | Loading at 30 psi (gm) | Efficiency* (%) |
| --- | --- | --- | --- |
| New Design | 0.623 | 235 | 98 |
| Conventional | 0.464 | 105 | 98 |

*Efficiency of the filter cartridges for all Examples was determined according to the general procedures set forth in Product Bulletin #1, Micron Rating and Efficiency, Filtration Products, 3M Company, St. Paul, MN.

Example 4

A filter element similar to that described in Example 1 but having a surface area of 0.625 m² was prepared and compared to the best performing commercially available conventional 5 μm pleated filter construction of the same external dimensions in their ability to filter AC Fine Air Cleaner Test Dust from a stream of water at a flow rate of 11.4 liters per minute. Results of this comparison are shown in Table 2.

TABLE 2

| Filter | New Design | Commercial Filter P | Commercial Filter G | Commercial Filter M |
|---|---|---|---|---|
| Surface area (m$^2$) | 0.625 | 0.51 | 0.46 | 0.51 |
| Loading (gm) | 233 | 101 | 40 | 98 |
| % Efficiency | 98 | 98 | 98 | 98 |

Example 5

A filter element similar to that described in Example 1 but having a surface area of 0.83 m$^2$ was prepared and compared to the best performing commercially available conventional 10 um pleated filter constructions of the same external dimensions in their ability to filter AC Fine Air Cleaner Test Dust from a stream of water at a flow rate of 11.4 liters per minute. Results of this comparison are shown in Table 3.

TABLE 3

| Filter | New Design | Commercial Filter P | Commercial Filter G | Commercial Filter M |
|---|---|---|---|---|
| Surface area (m$^2$) | 0.83 | 0.51 | 0.46 | 0.51 |
| Loading (gm) | 336 | 110 | 50 | 102 |
| % Efficiency | 95 | 98 | 95 | 98 |

Example 6

Two filter cartridges, identical to each other in all respects except that the filter media of one filter cartridge was not embossed to provide the primary radial pleat pattern, with 110 disk shaped layers and a surface area of 0.74 m$^2$, were compared for loading capacity using the test procedure outlined in Example 3. The loading capacity of the filter cartridge of the present invention was 278 g while that of the unembossed unpleated filter cartridge was 190 g.

Although the filter cartridge of the present invention has been illustrated and described herein as being tubular and/or generally cylindrical, the cartridge may readily be formed with other cross-sectional shapes such as squares, rectangles, multi-lobed or generally triangular, etc., and such other shapes are contemplated to be encompassed within the terms tubular and/or generally cylindrical.

What is claimed is:

1. A generally tubular filter cartridge for separating constituent components of a fluid mixture, said cartridge comprising a sheet that includes at least one layer of filter media arrayed in a nested arrangement of substantially disk-shaped filter members, each filter member comprising first and second annular sections of said sheet connected together at their outer circumference and having a pattern of radial pleats thereon which nest with the radial pleats on an adjoining section.

2. A filter cartridge according to claim 1 wherein said filter media comprises a plurality of layers.

3. A filter cartridge according to claim 2 wherein each layer of said plurality of adjacent filter media has the same porosity.

4. A filter cartridge according to claim 2 wherein each layer of said plurality of adjacent filter media has a different porosity.

5. A filter cartridge according to claim 4 wherein each layer of said plurality of filter media has a finer porosity than its adjacent upstream layer.

6. A filter cartridge according to claim 1 wherein the filter media element comprises a longitudinally collapsed, peripherally integral, continuous tube.

7. A filter cartridge according to claim 6 wherein said continuous tubular filter media element is formed from a substantially flat filter media material which has been seamed together by means of a fluid impervious seal.

8. A filter cartridge according to claim 7 wherein said substantially flat filter media element is embossed with a pattern of a multiplicity of transverse rows of alternating raised and recessed shapes.

9. A filter cartridge according to claim 8 wherein said embossed pattern defines a series of transverse and longitudinal forming lines for said disk shaped filter layers and said radial pleat pattern on said layers.

10. A filter cartridge according to claim 9 wherein the height of said embossed shapes is less than about 50% of the radius of the collapsed cylindrically shaped filter media element.

11. A filter cartridge according to claim 9 wherein said disk shaped layers are generated from an alternating inward/outward folding action on transverse forming lines of said tubular filter media element.

12. A filter cartridge according to claim 11 wherein the radial pleat pattern of adjacent disk layers nest together so as to form passages through which fluids are uniformly distributed over the total filter media element.

13. A filter cartridge according to claim 1 wherein said filter media element is attached to at least one endpiece by means of a fluid impervious seal, said endpiece providing a means for introducing or removing fluid components to or from the inner portion of said filter cartridge.

14. A filter cartridge according to claim 13 wherein said filter cartridge includes a supplemental support structure.

15. A filter cartridge according to claim 14 wherein said support structure comprises an inner porous tube-like member.

16. A filter cartridge according to claim 14 wherein said support structure comprises an outer porous tube-like member.

17. A filter cartridge according to claim 14 wherein said filter cartridge includes inner and outer support members.

18. A filter cartridge according to claim 1 wherein said filter media element is sealed on itself on one end and attached to an endpiece on the opposite end by means of a fluid impervious seal, said endpiece having a means of introducing or removing fluids to the inner portion of said filter.

19. A generally tubular filter cartridge for separating constituent components of a fluid mixture, said cartridge comprising a porous tubular sheet that includes at least one filter medium layer longitudinally collapsed to form disk-shaped filter members that each comprise connected first and second annular sections of said sheet, said sections having a pattern of radial pleats thereon which nest with the radial pleats of adjoining sections, the annular sections leaving a central cylindrical opening disposed along the longitudinal axis of the cartridge, whereby fluid to be filtered passes through the sheet into or from the central cylindrical opening.

20. A cartridge of claim 19 in which a coarse scrim is disposed in laminar relationship on at least one side of the filter medium layer.

21. A cartridge of claim 19 in which the radial pleats comprise cylindrical recesses and raised areas in the filter sheet, with the cylindrical recesses and raised areas of one layer mating with the recesses and raised areas of adjacent layers so that the cylindrical recesses and raised areas nest within one another.

* * * * *

UNITED STATES PATENT AND TRADEMARK OFFICE
CERTIFICATE OF CORRECTION

PATENT NO. : 4,842,739

DATED : June 27, 1989

INVENTOR(S) : Yuan-Ming Tang

It is certified that error appears in the above-identified patent and that said Letters Patent is hereby corrected as shown below:

Column 4, line 39, after "structure." insert -- As will be seen from the drawings, each filter member 31 comprises two annular sections of the filter element or sheet 30. The annular sections are connected together at their outer circumference, which is the fold line between the sections. --.

Column 4, line 58, after "tridges." cancel the remainder of the paragraph (i.e., the last two sentences of the paragraph).

Signed and Sealed this

Fifteenth Day of May, 1990

*Attest:*

HARRY F. MANBECK, JR.

*Attesting Officer*   *Commissioner of Patents and Trademarks*